United States Patent [19]

Mayr et al.

[11] Patent Number: 4,542,198

[45] Date of Patent: * Sep. 17, 1985

[54] POLYMERIZATION CATALYSTS

[75] Inventors: Adolfo Mayr, Ferrara; Umberto Giannini, Milan; Ermanno Susa, Ferrara; Paolo Longi, Milan; Ettore Giachetti, Milan; Domenico DeLuca, Milan, all of Italy

[73] Assignee: Montedison S.p.A., Milan, Italy

[*] Notice: The portion of the term of this patent subsequent to Nov. 3, 1998 has been disclaimed.

[21] Appl. No.: 554,705

[22] Filed: Nov. 23, 1983

Related U.S. Application Data

[63] Continuation of Ser. No. 397,111, Sep. 13, 1973, abandoned, which is a continuation-in-part of Ser. No. 248,597, Apr. 28, 1972, abandoned, which is a continuation of Ser. No. 22,011, Mar. 23, 1970, abandoned.

[30] Foreign Application Priority Data

Mar. 24, 1969 [IT] Italy .............................. 14473 A/69

[51] Int. Cl.$^4$ ........................... C08F 4/02; C08F 10/02
[52] U.S. Cl. .................................... 526/125; 502/104; 502/105; 502/134; 526/352; 526/906; 526/908; 526/909
[58] Field of Search ....................... 502/104, 105, 134; 526/125

[56] References Cited

U.S. PATENT DOCUMENTS

| | | | |
|---|---|---|---|
| 2,981,725 | 4/1961 | Luft et al. | 526/125 |
| 3,008,943 | 11/1961 | Guyer | 526/124 |
| 3,168,484 | 2/1965 | Engel et al. | 526/129 |
| 3,205,216 | 9/1965 | McManimie et al. | 526/159 |
| 3,238,146 | 3/1966 | Hewett et al. | 526/125 |
| 3,400,110 | 9/1968 | Dassesse et al. | 526/125 |
| 3,574,138 | 4/1971 | Ziegler et al. | 526/159 |
| 3,642,746 | 2/1972 | Kashiwa et al. | 526/125 |
| 4,298,718 | 11/1981 | Mayr et al. | 526/125 |

FOREIGN PATENT DOCUMENTS

| | | |
|---|---|---|
| 222426 | 6/1959 | Australia . |
| 2013730 | 10/1970 | Fed. Rep. of Germany ...... 526/125 |

*Primary Examiner*—Edward J. Smith

[57] ABSTRACT

Highly active catalysts for the polymerization of olefins are disclosed. The catalysts are prepared by mixing a hydride or organometallic compound of a metal belonging to Groups I, II or III of the Mendelyeev Periodic Table with the product obtained by contacting an oxygenated Ti compound in which one or more Ti atoms are bound through oxygen atoms to organic radicals with an activated anhydrous Mg dihalide. The polymerization of ethylene by means of said catalysts is also disclosed.

12 Claims, No Drawings

POLYMERIZATION CATALYSTS

This is a continuation of application Ser. No. 397,111 filed Sept. 13, 1973 now abandoned, which in turn is a continuation-in-part of Ser. No. 248,597, filed Apr. 28, 1972 and now abandoned which was a continuation of Ser. No. 22,011, filed Mar. 23, 1970 and now abandoned.

THE PRIOR ART

Ethylene has been polymerized and copolymerized by means of various typs of catalysts. One of the best known catalysts consists of or is formed by the product of reaction between a titanium or vanadium compound and an organometallic derivative of the metals of Groups I, II or III of the (Mendelyeev) Periodic System.

THE PRESENT INVENTION

This invention provides catalysts for the polymerization of olefins which are considerably more active than the catalysts of the prior art and by means of which it is possible to obtain an exceptional increase in the quantity of polymer produced with respect to the amount of catalyst used.

An application originating with our group discloses catalysts for the polymerization of olefins which are highly active and which consist of the product obtained by mixing a hydride or organometallic compound of a Group I, II or III metal with the product obtained by contacting a titanium or vanadium trihalide with a carrier consisting of anhydrous Mg or Zn chloride under conditions such that the Mg or Zn chloride is activated, or with a carrier consisting of the Mg or Zn halide in preactivated form.

We have now found that it is possible to obtain catalysts the activity of which, in olefin polymerization, is comparable to and in some instances even superior to the activity of the catalysts described in the aforesaid application, starting with oxygenated Ti compounds in which one or more Ti atoms are bound through oxygen atoms to organic radicals.

Examples of the useful oxygenated catalysts are, for instance, the following:
$Ti(O-iC_3H_7)Cl_3$; $Ti_2(O_2C_6H_4)Cl_6$; $Ti(O-_nC_4H_9)_2Cl_2$; $Ti(OC_2H_5)_3Cl$; $Ti(O-iC_3H_7)_4$; $Ti(OC_6H_5)Cl_3$; $Ti(O-C_6H_{11})_2Cl_2$; $Ti(O-CH_2-C_6H_5)_3$; $Ti(O-CH_2-CH_2-C_5H_4N)_4$; $Ti_2Cl_3(OC_3H_7)_3$; $Ti(O-C(CH_3)=CH-CO-CH_3)Cl_3$; $Ti(CH_3COO)Cl_3$; $Ti(C_6H_5COO)Cl_3$; $Ti(O-CH_2-CH_2-OCH_3)_2Br_2$; $Ti(O-C_6H_4OCH_3)_3I$; $Ti(OC_6H_4Cl)Cl_3$.

The catalysts of the present invention thus consist of the product obtained by mixing a hydride or an organometallic compound of a metal belonging to Group I, II or III of the (Mendelyeev) Periodic System with the product obtained by contacting an oxygenated Ti compound of the type indicated above with a carrier consisting of or comprising an anhydrous Mg halide, more particularly the chloride or bromide, under conditions such that activation of the Mg halide results, or by contacting the oxygenated Ti compound with an anhydrous Mg halide in pre-activated condition.

By "anhydrous Mg halide in activated form" we mean a halide in a form characterized in that in its X-ray spectrum the intensity of the diffraction line of greatest intensity in the spectrum of normal (non-activated) Mg halide is strongly decreased and there appears a broad halo which is not present in the spectrum of the normal Mg halide.

In the case of anhydrous Mg chloride the active form of this invention is characterized in that in its X-ray spectrum the diffraction line at $d=2.56$ Å (which is most intense in the spectrum of the normal non-active $MgCl_2$) is strongly decreased and there appears a broad halo identified as being comprised between $d=2.56$ Å and $d=2.95$ Å.

Similarly, the X-ray spectrum of the active form of $MgBr_2$ of the invention is characterized by the fact that the diffraction line at $d=2.93$ Å (which is the most intense diffraction line appearing in the spectrum of normal, non-active $MgBr_2$) is strongly decreased in intensity and there appears a diffused halo appearing between $d=2.80$ Å and $d=3.25$ Å.

According to a preferred embodiment of the invention, the supported catalyst-forming component is prepared by co-grinding a mixture of the oxygenated Ti compound with the anhydrous Mg halide for a time, and under conditions, such that the anhydrous Mg halide is transformed to the active form required for the practice of this invention.

The grinding is preferably carried out in a ball mill, with the mixture in dry condition, i.e., in the absence of inert liquid diluents.

In another modification, the supported catalyst-forming component is prepared by mixing the oxygenated Ti compound with an anhydrous Mg halide which has been activated by grinding prior to being mixed with the Ti compound. However, in this case, the Ti compound and preactivated Mg halide are preferably mixed in suspension in an inert liquid diluent.

Anhydrous Mg halide in the required activated form may also be obtained by methods other than grinding. One such method consists in starting with a compound RMgX (in which R is a hydrocarbon radical and X is halogen), and decomposing said compound RMgX by treating it with a halogenated compound such as, for instance, gaseous hydrochloric acid, i.e. according to methods known in the literature.

The quantity of the oxygenated Ti compound used for preparing the supported catalyst-forming component may be comprised within a wide range, the lower limit of which may be 0.01% by weight with respect to the carrier or support and the upper limit of which may be 30% by weight or higher.

Particularly satisfactory results are obtained with respect to the polymer yield referred both to the amount of Ti compound used and the carrier or support when the amount of the Ti compound present on the carrier is comprised between 1% and 10% by weight.

Hydrides and organometallic compounds which are particularly suited for the preparation of the catalysts of this invention are:
$Al(C_2H_5)_3$; $Al(C_2H_5)_2Cl$; $Al(iC_4H_9)_3$; $Al(iC_4H_9)_2Cl$; $Al(C_2H_5)_2H$; $LiC_4H_9$; $Al(C_2H_5)_2Br$; $LiAl(iC_4H_9)_4$; $Al(iC_4H_9)_2H$ and $Al_2(C_2H_5)_3Cl_3$.

The molar ratio between Al compound and the Ti compound is not critical. When the catalysts are to be used for the polymerization of ethylene, said ratio is preferably comprised between 50 and 1000.

The catalysts of the present invention can be used in the polymerization or copolymerization of olefins by operating according to the known techniques, that is in liquid phase, in the presence or absence of an inert solvent, or in gaseous phase.

The temperature of the olefin polymerization or copolymerization in contact with the present catalysts is comprised between −80° and 200° C., preferably between 50° C. and 100° C., at either atmospheric or subatmospheric pressure.

The molecular weight of the homopolymer or copolymer produced can be regulated, during the polymerization or copolymerization, by operating in the presence of known molecular-weight regulating agents such as, for instance, alkyl halides, organometallic compounds of zinc or cadium, or hydrogen.

As is known, the activity of the conventional "Ziegler catalysts" obtained by mixing transition metal compounds with organometallic compounds of a Group I, II or III metal is considerably reduced by the presence in the polymerization system of hydrogen or other chain transfer agents which function as regulators of the molecular weight of the polymer or copolymer produced.

In contrast, we have found that it is possible to use the molecular weight-regulating agents for regulating the molecular weight of the polymer or copolymer produced to low, and even very low values, in the presence of the catalysts of this invention without any appreciable reduction in the activity of the catalysts.

For instance, it is possible in polymerizing ethylene in contact with the present catalysts to regulate the molecular weight of the polyethylene produced to values within a practical range corresponding to intrinsic viscosities for the polyethylene of between about 1.5 and 3.0 dl/g. by including a known regulator of the molecular weight in the polymerization system, without such a reduction in the yield of polyethylene obtained as to necessitate special purification after-treatments of the polymer for the removal of catalysts residues from it. Any of the known molecular weight-regulators may be used with the present catalysts.

Polyethylene obtained with the aid of the catalysts of this invention is a substantially linear, highly crystalline polymer having a density of 0.96 g/cc. and processability characteristics which are in general superior to those of the polyethylene obtained with conventional "Ziegler catalysts". The Ti content in the unpurified polyethylene is less than 20 ppm. Moreover, it has been discovered that, using a catalyst according to this invention, the polymer obtained has a granulometric distribution very similar to that of the starting (activated) carrier.

Thus, it is possible, by using a carrier or support suitably classified by screening to obtain polymers having a controlled granulometric distribution. The preparation of the catalysts which polymerize the olefins to polymers of controlled granulometry may be carried out either by screening of the already supported catalytic component or by classification of the carrier or support in active form, on which carrier or support the oxygenated Ti compound is then dispersed.

The following examples are given to illustrate the invention and are not intended to be limiting. Unless otherwise stated, the percentages given in the examples are by weight. The intrinsic viscosities of the polymers given in the examples were measured in tetralin at 135° C.

EXAMPLE 1

0.706 g of $TiCl_3(O_nC_3H_7)$ and 7.829 g of anhydrous $MgCl_2$ were ground in a nitrogen atmosphere for 20 hours, in a glass mill (length: 100 mm; diameter; 50 mm), containing 550 g of steel balls with an individual diameter of 9.5 mm.

0.0131 g of the mixture thus ground, suspended in 1500 cc of n-heptane, were introduced, together with 2 cc of $Al(i—C_4H_9)_3$, in a nitrogen atmosphere, in a stainless steel autoclave of 3 liters holding capacity, fitted with a propeller stirrer and heated to a temperature of 80° C.

To this mixture was then ethylene (10 atm) and hydrogen (5 atm) and the total pressure of 15 atm was maintained constant throughout the test by continuously introducing ethylene.

After 8 hours the polymerization was stopped, the polymer obtained was filtered and then dried. Thereby were obtained 937 g of granular polyethylene with an apparent density of 0.43 g/cc and an intrinsic viscosity determined in tetralin at 135° C., $[\eta]=1.8$ dl/g. The yield in polymer amounted to 3,860,000 g/g of Ti.

EXAMPLE 2

In the mill described in Example 1, heated to 150° C., there were ground for 18 hours 0.8110 g of $Ti(O n—C_3H_7)_4$ and 10.5 g of anhydrous $MgCl_2$.

Using 0.066 g of this mixture and by conducting the polymerization of the ethylene according to the conditions described in Example 1. there were obtained 120 g of polyethylene having an intrinsic viscosity, determined in tetralin at 135° C. $[\eta]=2.4$ dl/g.

The yield is polymer amounted to 150,000 g/g of Ti.

EXAMPLE 3

0.8535 g of $TiCl_2(O n—C_3H_7)_2$ and 10.201 g of anhydrous $MgCl_2$ were ground together for 18 hours at 20° C., under a nitrogen atmosphere, in the mill as described in Example 1.

By using 0.0131 g of the ground mixture and by carrying out the polymerization according to the procedures described in Example 1, there were obtained 640 g of polyethylene having an intrinsic viscosity $[\eta]=2.3$ dl/g, determined in tetralin at 135° C.

The yield in polymer amounted to 950,000 g/g of Ti.

EXAMPLE 4

In a mill grinder as described in Example 1, heated to a temperature of 150° C., there were ground for 20 hours 1,340 g of $TiCl(O—n—C_3H_7)_3$ and 10.7162 g of anhydrous $MgCl_2$.

By using 0.0420 g of this ground mixture and by operating according to what described in Example 1, there were obtained 110 g of polyethylene having an intrinsic viscosity, determined in tetralin at 135° C., $[\eta]=2.22$ dl/g. The yield in polymer amounted in 162,000 g/g of Ti.

EXAMPLE 5

0.9125 g of $TiCl_3(O n—C_3H_7)$ and 7.9102 g of anhydrous $MgBr_2$ were ground for 20 hours at 20° C. in a mill as described in Example 1.

By using 0.0151 g of the mixture thus prepared and by carrying out the polymerization of the ethylene according to the procedures described in Example 1, there were obtained 475 g of polyethylene having an intrinsic viscosity, determined in tetralin at 135° C., $[\eta]=1.88$ dl/g. The yield in polymer was 1,350,000 g/g of Ti.

EXAMPLE 6

1.0 g of $TiCl_3(OC_6H_5)$ and 9.4510 g of anhydrous $MgCl_2$ were ground for 18 hours at 20° C. and under a nitrogen atmosphere in the mill described in Example 1. By using 0.0119 g of this mixture and operating according to Example 1, there were obtained 429 g of polyethylene having an intrinsic viscosity, determined in tetralin at 135° C., $[\eta]=1.49$ dl/g. The yield in polymer amounted to 1,950,000 g/g of Ti.

EXAMPLE 7

7.13 g of Ti(On—$C_3H_7$)$_4$ dissolved in 10 cc of anhydrous xylol were made to react in a nitrogen atmosphere with 3.9 g of titanium trichloride, at a temperature of 120° C., in a flask of 25 cc holding capacity, provided with a stirrer.

After 12 hours, the resulting suspension was filtered, the solid was repeatedly washed with n-heptane and finally dried. Thereby, were obtained 4 g of a brown powdery product, which at the elementary analysis showed the following composition: $Ti_2Cl_3$(On—$C_3H_7$)$_3$. The titanium present in the compound proved to have a valency=3.

0.800 g of $Ti_2Cl_3$(On—$C_3H_7$)$_3$, prepared as above, were ground in a nitrogen atmosphere together with 7.241 g of anhydrous $MgCl_2$ in the mill described in Example 1.

By using 0.096 g of this mixture and by operating according to the procedures described in Example 1, but interrupting the polymerization after 5 hours, there were obtained 810 g of polyethylene having an intrinsic viscosity, determined in tetralin at 135 C, $[\eta]=1.68$ dl/g. The yield in polymer amounted to 336,000 g/g of Ti.

EXAMPLE 8

In the mill described in Example 1, heated to 130° C., there were ground for 20 hours, in a nitrogen atmosphere, 1.210 g of titanium trichloroacetylacetonate [$TiCl_3(C_5H_7O_2)$] and 8.620 g of anhydrous $MgCl_2$.

Using 0.0179 of this mixture and carrying out the polymerization of the ethylene according to the procedures described in Example 1, there were obtained 362 g of polyethylene having an intrinsic viscosity determined in tetralin at 135° C. $[\eta]=2.14$ dl/g. The yield in polymer amounted to 930,000 g/g of Ti.

EXAMPLE 9

In the mill described in Example 1, there were ground, for 20 hours in a nitrogen atmosphere at 20° C., 0.825 g of TiCl(OCO—$CH_3$) and 8.135 g of anhydrous $MgCl_2$.

Using 0.0127 g of this mixture and operating according to the procedures of Example 1, there were obtained 280 g of polyethylene having an intrinsic viscosity, determined in tetralin at 135° C., $[\eta]=2.01$ dl/g. The yield in polymer amounted to 1,065,000 g/g of Ti.

EXAMPLE 10

In the mill described in Example 1, there were ground for 20 hours in an atmosphere of nitrogen at 20° C., 0.9734 g of $TiCl_3$(OCO$C_6H_5$) and 10.5718 g of anhydrous $MgCl_2$.

Using 0.0138 g of this mixture and operating according to the procedures described in Example 1, there were obtained 375 g of polyethylene having an intrinsic viscosity, determined in tetralin at 135° C., $[\eta]=2.20$ dl/g. The yield in polymer amounted to 1,855,000 g/g of Ti.

EXAMPLE 11

In the mill described in Example 1, there were ground, for 20 hours in a nitrogen atmosphere at 0° C., 1.0828 g of $TiBr_3$(On—$C_3H_7$) and 9.870 g of anhydrous $MgCl_2$.

Using 0.0128 g of this mixture and operating according to the procedures described in Example 1, there were obtained 352 g of polyethylene having an intrinsic viscosity, determined in tetralin at 135° C., $[\eta]=1.59$ dl/g. The yield is polymer amounted to 2,015,000 g/g of Ti.

EXAMPLE 12

In a rotary ball mill of the centrifugal type there were ground, for 3 hours, 0.038 g of $TiCl_3OCH_3$ and 10 g of anhydrous $MgCl_2$.

Using 0.15 g of the ground mixture and operating according to the procedures described in Example 1, for 4 hours, there were obtained 125 g of polyethylene having an intrinsic viscosity $[\eta]=2.9$ dl/g. The yield in polymer amounted to 1,250,000 g/g of Ti.

EXAMPLE 13

Under the same conditions as those indicated in Example 12, there were ground 1 g of Ti(On—$C_4H_9$)$_4$ and 13 g of anhydrous $MgCl_2$.

Using 0.16 g of this ground mixture and by operating under the same polymerization conditions of Example 12, there were obtained 220 g of polyethylene having an intrinsic viscosity $[\eta]=2.5$ dl/g. The yield in polymer amounted to 182,000 g/g of Ti.

EXAMPLE 14

In the mill and under the same conditions as described in Example 12 there were ground, for 3 hours, 0.28 g of $TiCl_3$(O—2-ethylhexyl) and 10 g of anhydrous $MgCl_2$.

Using 0.2283 g of the ground mixture and by polymerizing ethylene under the same conditions as those described in Example 12, there were obtained 445 g of polyethylene having an intrinsic viscosity $[\eta]=2.0$ dl/g. The yield in polymer amounted to 780,000 g/g of Ti.

EXAMPLE 15

In the mill of Example 12, there were ground together for 3 hours 0.20 g of $TiCl_3(OC_{10}H_7)$ (obtained from $TiCl_4$+beta-naphol) and 10 g of anhydrous $MgCl_2$.

Using 0.1228 g of the ground product and operating under the same polymerization conditions as those described in Example 12, there were obtained 300 g of polyethylene having an intrinsic viscosity $[\eta]=2.0$ dl/g.

EXAMPLE 16

Under the same conditions as those described in Example 12, there were ground together 0.1 g of $TiCl_3(OC_6H_4NO_2)$ and 10 g of anhydrous $MgCl_2$. Using 0.083 g of the mixture thus ground and by polymerizing under the conditions of Example 12, there were obtained 91 g of polyethylene having an intrinsic viscosity $[\eta]=2.6$ dl/g, while the yield in polymer amounted to 842,000 g/g of Ti.

EXAMPLE 17

Operating under the same conditions as those of Example 12, 0.1 g of $TiCl_3(OC_6H_4Cl)$ and 10 g of anhydrous $MgCl_2$ were ground together. Using 0.109 g of the ground mixture and polymerizing ethylene in contact with the ground mixture, under the polymerization conditions of Example 12, there were obtained 271 g of polyethylene having an intrinsic viscosity $[\eta]=2.2$ dl/g. The yield in polymer amounted to 2,480,000 g/g of Ti.

EXAMPLE 18

6.2 g of ethylene glycol were reacted in a reflux reactor for 3 hours with 11.3 g of $TiCl_4$ dissolved in 100 cc of n-heptane.

The solid product thus formed was separated, washed with n-heptane and finally dried under vacuum. The analysis gave the following composition: $Ti=17.15\%$; $Cl=39.2\%$.

0.45 g of the Ti-chloroalcoholate thus prepared and 10 g of anhydrous $MgCl_2$ were ground together under the conditions of Example 12.

Using 0.1048 g of the ground product and polymerizing ethylene under the conditions of Example 12, there were obtained 226 g of polyethylene having an intrinsic viscosity $[\eta]=1.5$ dl/g. The yield in polymer amounted to 280,000 g/g of Ti.

EXAMPLE 19

In a ball mill there were ground together for 3 hours, 10 g of anhydrous $MgCl_2$ and 0.35 g of $TiCl_3(OiC_3H_7)$. The ground product was then classified granulometrically on a vibrating screen or sieve, in an inert atmosphere. The fractions which were drawn from it were:

Fraction 1 > 0.044 mm < 0.062 mm

Fraction 2 > 0.088 mm < 0.125 mm

Into a 1.8 liter autoclave there was then introduced 1 liter of n-heptane and 2.0 g of $Al(iC_4H_9)_3$. This mixture was brought up to 85° C. and 0.11 g of fraction 1 of the supported catalytic component was introduced while the pressure was brought up to 4 atm. by means of $H_2$ and then to 13 atm. by feeding in ethylene.

The pressure was maintained constant at 13 atm. by feeding in ethylene. After 3 hours of reaction, there were discharged 355 g of polymer having an intrinsic viscosity $[\eta]=2.2$ dl/g. The yield in polymer amounted to 357,000 g/g of Ti.

In the same conditions above indicated, by using 0.11 g of the fraction 2 of the catalytic component, 347 g of polymer were obtained having intrinsic viscosity $[\eta]=2$. Polymer yield 347,000 g/g of Ti.

By fractioning on a vibrating screen the following granulometric distribution of the polymers thus prepared was obtained.

TABLE

| Net light of the screen | Polymer % Fraction 1 | Polymer % Fraction 2 |
|---|---|---|
| >2 mm | — | 27.5 |
| >1.41 mm <2 mm | 0.8 | 66.0 |
| >1.0 mm <1.41 mm | 24.6 | 5.1 |
| >0.71 mm <1.0 mm | 47.9 | 1.0 |
| >0.5 mm <0.71 mm | 15.9 | 0.3 |
| >0.35 mm <0.5 mm | 5.5 | 0.1 |
| >0.177 mm <0.35 mm | 4.5 | 0.1 |
| >0.177 | 0.9 | 0.05 |

We claim:

1. Highly active catalysts for the polymerization of olefins and obtained by mixing
   (a) a catalyst-forming component which is a hydride or organo-metallic compound of a metal belonging to one of Groups I to III inclusive of the Mendelyeev Periodic Table
   with
   (b) a supported catalyst-forming component obtained by contacting a titanium compound containing organic radicals bound to oxygen through a carbon atom and in which at least one Ti atom is bound through the oxygen atom to the organic radical, any valency of the Ti atom not satisified by organic radicals bound to oxygen through the carbon atom being satisfied by halogen, with a carrier comprising an anhydrous magnesium dihalide in an active form characterized in that its X-ray powder spectrum does not show the most intense diffraction line as it appears in the X-ray powder spectrum of the normal, non-active magnesium dihalide, the spectrum of the active magnesium dihalide showing a broadening of said most intense diffraction line.

2. Catalysts according to claim 1, characterized in that the amount of the titanium compound on the carrier is from 0.01% to 30% by weight.

3. Catalysts according to claim 1, characterized in that the amount of the titanium compound on the carrier is from 1% to 10% by weight.

4. Catalysts according to claim 1, characterized in that the anhydrous magnesium dihalide is anhydrous magnesium dichloride.

5. Catalysts according to claim 1, characterized in that the anhydrous magnesium dihalide is anhydrous magnesium dibromide.

6. The method of preparing catalysts which are highly active in the polymerization of olefins which consists of mixing
   (a) a catalyst-forming component which is a hydride or organo-metallic compound of a metal belonging to one of Groups I to III inclusive of the Mendelyeev Periodic Table
   with
   (b) a supported catalyst-forming component obtained by contacting a titanium compound containing organic radicals bound to oxygen through a carbon atom and in which at least one Ti atom is bound through the oxygen atom to the organic radical, any valency of the Ti atom not satisfied by organic radicals bound to oxygen through the carbon atom being satisfied by halogen, with a carrier comprising an anhydrous magnesium dihalide in an active condition characterized in that its X-ray powder spectrum does not show the most intense diffraction lines as it appears in the X-ray powder spectrum of the normal, non-active magnesium dihalide, the spectrum of the active magnesium dihalide showing a broadening of said most intense diffraction line.

7. The method according to claim 6, in which catalyst-forming component (b) is obtained by cogrinding the titanium compound with a starting magnesium dihalide in its normal non-activated condition.

8. The method of claim 7, wherein the co-grinding of the titanium compound and anhydrous magnesium dihalide is carried out in a ball mill, in the absence of inert liquid diluents.

9. The method according to claim 6, in which catalyst-forming component (b) is obtained by contacting the titanium compound with an anhydrous magnesium dihalide in preactivated condition.

10. The method according to claim 6, in which catalyst-forming component (b) is obtained by contacting the titanium compound with a preactivated magnesium dihalide which is the decomposition product of an organo-metallic compound of formula RMgX, in which R is a hydrocarbon radical and X is halogen.

11. A process for the catalytic polymerization of ethylene to a linear, highly crystalline polyethylene useful as produced without requiring special purifying after-treatments for the removal of catalyst residues therefrom, which comprises polymerizing the ethylene in contact with a catalyst according to claim 1.

12. The process of claim 11, wherein the ethylene is polymerized in contact with a catalyst according to claim 1 and in the presence of a regulator of the molecular weight of the polyethylene produced.

* * * * *